United States Patent
Kumagai

(10) Patent No.: US 8,863,112 B2
(45) Date of Patent: Oct. 14, 2014

(54) INFORMATION PROCESSING APPARATUS AND CONTROLLING METHOD THEREOF

(75) Inventor: Atsushi Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 13/534,618

(22) Filed: Jun. 27, 2012

(65) Prior Publication Data

US 2013/0024854 A1    Jan. 24, 2013

(30) Foreign Application Priority Data

Jul. 21, 2011 (JP) ................................. 2011-160305

(51) Int. Cl.
| | |
|---|---|
| G06F 15/16 | (2006.01) |
| G06F 13/00 | (2006.01) |
| H04L 29/06 | (2006.01) |
| G06F 3/00 | (2006.01) |
| G06F 9/44 | (2006.01) |
| G06F 9/445 | (2006.01) |

(52) U.S. Cl.
CPC .............. G06F 8/67 (2013.01); G06F 9/44526 (2013.01)
USPC ............. 717/174; 709/201; 709/219; 710/33; 713/155; 713/156; 713/161; 715/760; 717/169; 717/170; 717/177; 717/178

(58) Field of Classification Search
CPC ......... G06F 21/53; G06F 21/57; G06F 21/84; G06F 8/20; G06F 8/65; G06F 8/71; G06F 9/455; G06F 9/541; G06F 9/4411; G06F 13/385; H04L 67/02
See application file for complete search history.

(56) References Cited

U.S. PATENT DOCUMENTS

| | | | | |
|---|---|---|---|---|
| 7,644,404 | B2 * | 1/2010 | Rao et al. ....................... | 717/169 |
| 7,984,115 | B2 * | 7/2011 | Tien et al. ..................... | 709/219 |
| 8,089,661 | B2 * | 1/2012 | Mori ............................. | 713/155 |
| 8,176,321 | B1 * | 5/2012 | Perry et al. .................... | 717/177 |
| 8,200,962 | B1 * | 6/2012 | Boodman et al. ............. | 713/161 |
| 8,510,729 | B2 * | 8/2013 | Weissman et al. ............ | 717/170 |
| 8,667,487 | B1 * | 3/2014 | Boodman et al. ............. | 717/178 |
| 2008/0046720 | A1 * | 2/2008 | Sugishita et al. ............. | 713/156 |
| 2008/0140671 | A1 * | 6/2008 | Tien et al. ..................... | 709/201 |
| 2009/0043924 | A1 * | 2/2009 | Namba .......................... | 710/33 |
| 2010/0299663 | A1 * | 11/2010 | Weissman et al. ............ | 717/170 |
| 2011/0010642 | A1 * | 1/2011 | Nagai ........................... | 715/760 |

FOREIGN PATENT DOCUMENTS

JP     2005-236507     9/2005

* cited by examiner

*Primary Examiner* — Don Wong
*Assistant Examiner* — Anibal Rivera
(74) *Attorney, Agent, or Firm* — Cowan, Liebowitz & Latman, P.C.

(57) ABSTRACT

An application program determines, based upon a user's operation that has been received during execution, whether installation of an extension function is necessary, saves information identifying an extension function whose installation is necessary in memory if it is determined that installation of the extension function is necessary, activates an installer of the extension function whose installation is necessary and then terminates execution of this application program. If the application program is activated by the installer after the completion of installation, the application program activates the extension function, which has been installed by the installer, based upon the identifying information that has been saved in the memory.

11 Claims, 18 Drawing Sheets

F I G. 1
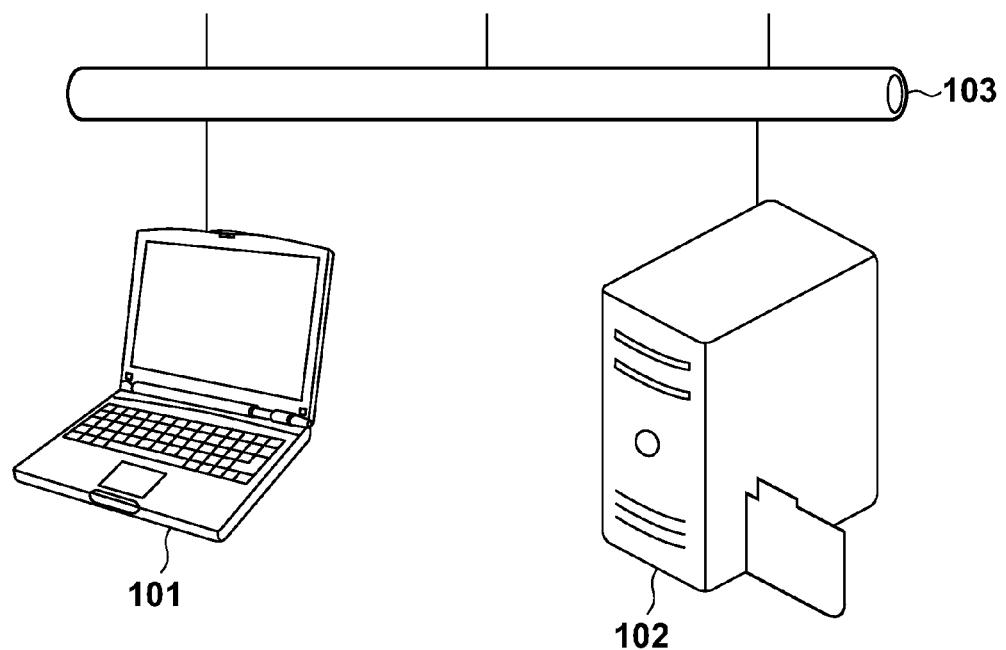

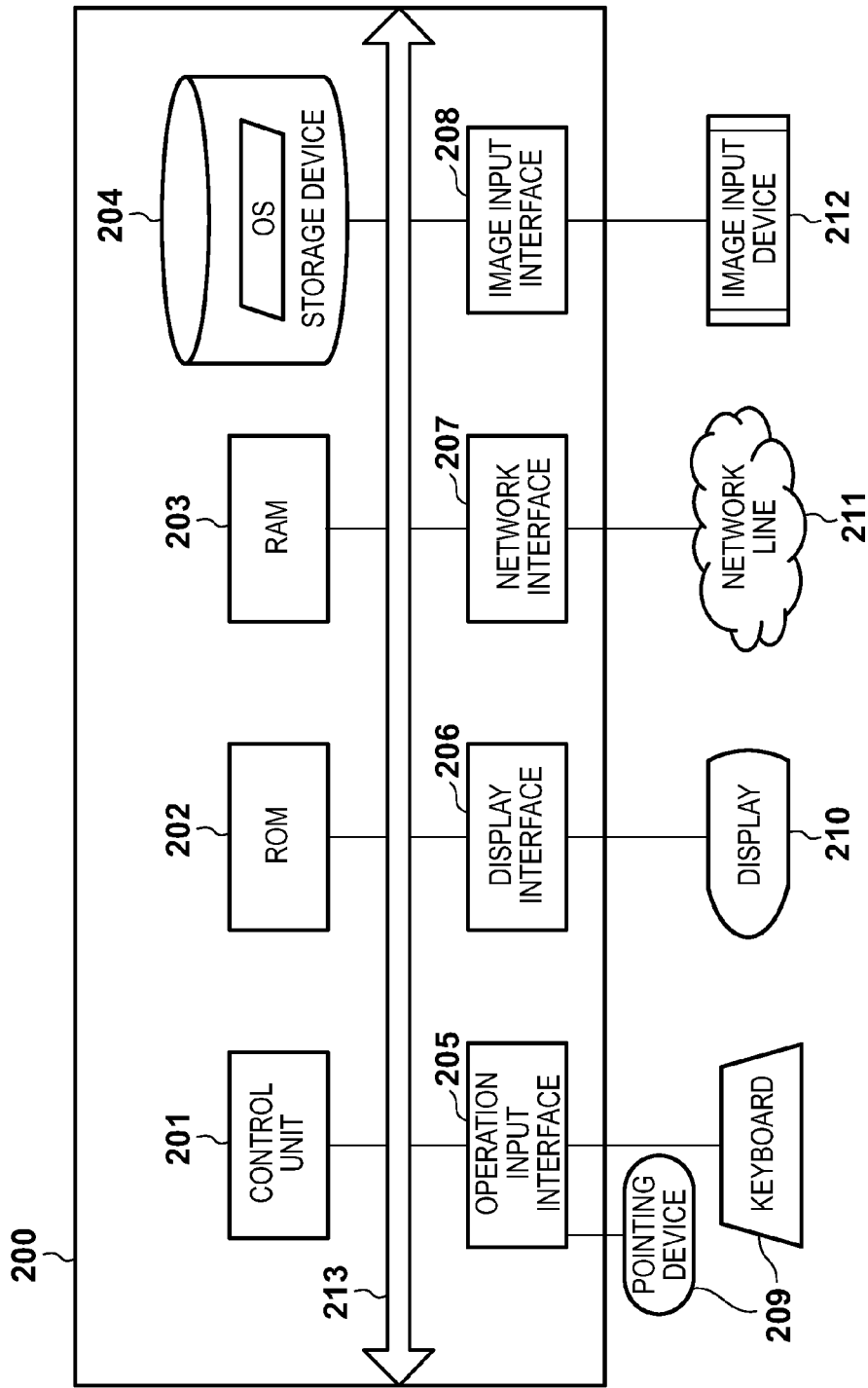

FIG. 4C

```
<?xml version="1.0" encoding="utf-8"?>
<SelectionList>
    <Selection="/Root/Pictures/2010_09/27/IMG_0024.JPG"/>    ~451
    <Selection="/Root/Pictures/2010_09/27/IMG_0027.JPG"/>    ~452
    <Selection="/Root/Pictures/2010_09/27/IMG_0028.JPG"/>    ~453
</ActionsList>
```

FIG. 4D

```
<?xml version="1.0" encoding="utf-8"?>                                461    460
<History>
    <Target Path="/Root/Pictures/2010_09_27/IMG_0025.JPG">
        <EditAction Type="TRIM"                                         463
                    Parameter="(100.200)-(1124, 968)"/>                 462
                                                                        464
        <EditAction Type="CONTRAST"                                     465
                    Parameter="+10"/>                                   466
                                                                        467
    </Target>
    <Target Path="/Root/Pictures/2010_09_27/IMG_0029.JPG">
        <EditAction Type="RESIZE"
                    Parameter="50%"/>
    </Target>                                                           470
</History>
```

F I G. 5
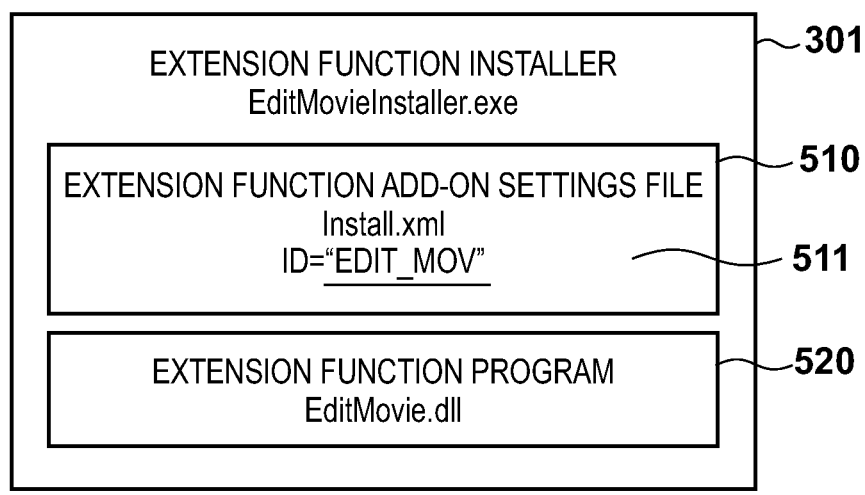

F I G. 7
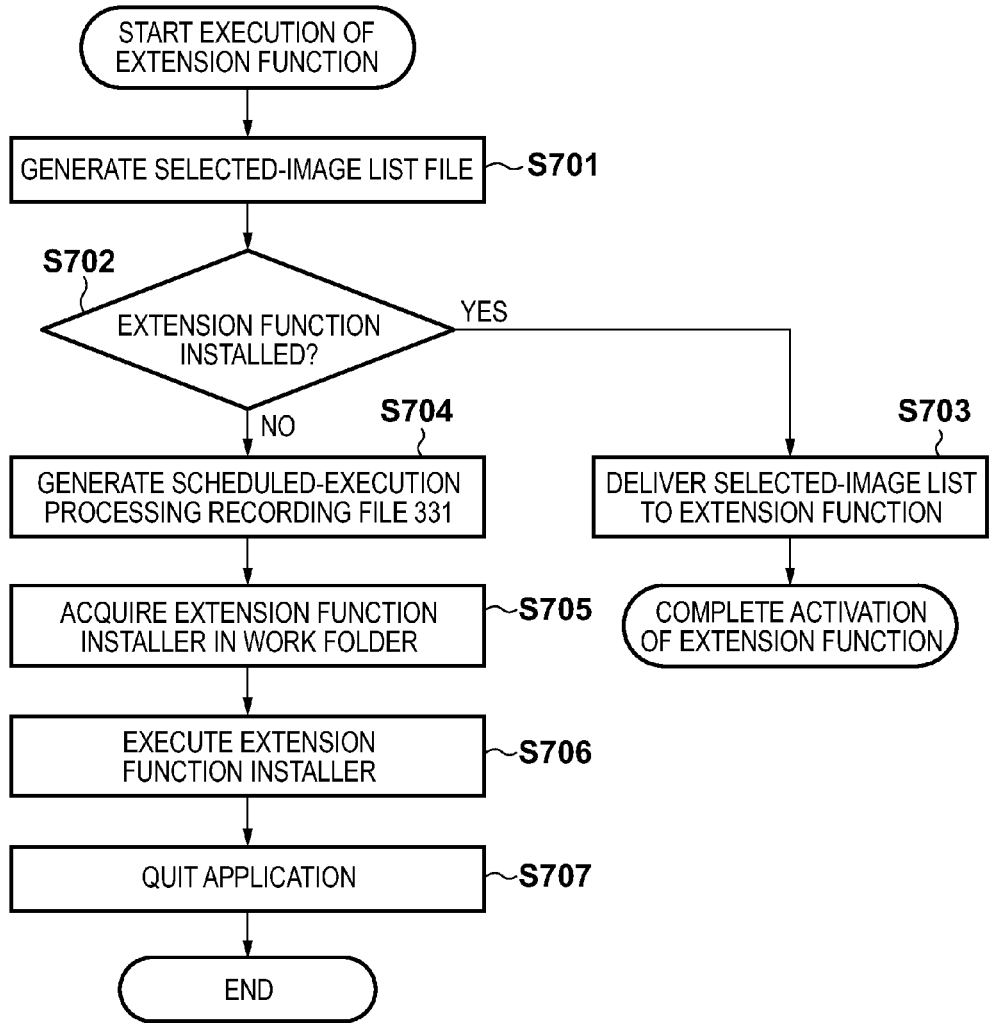

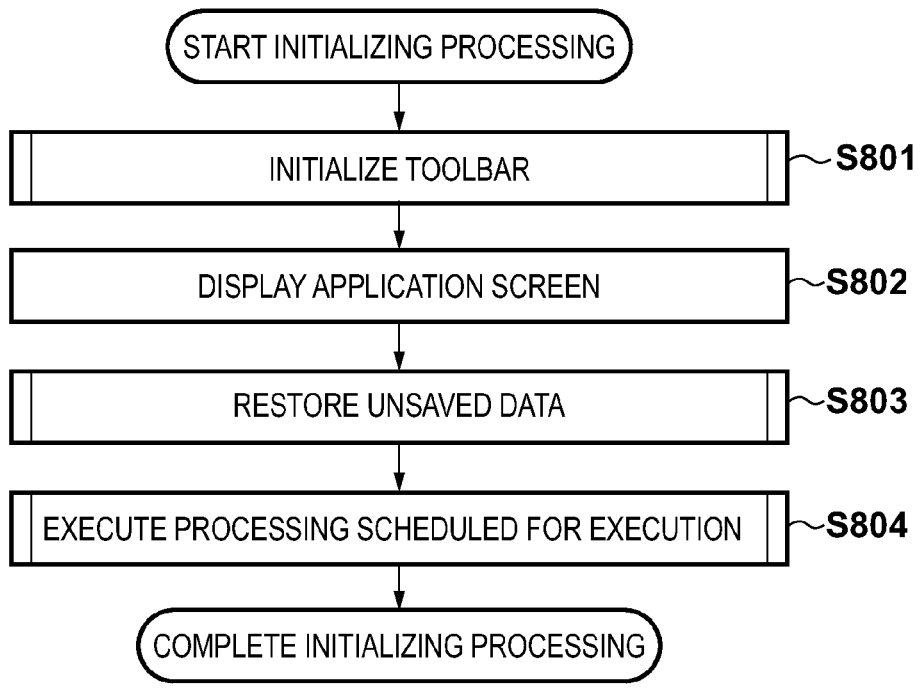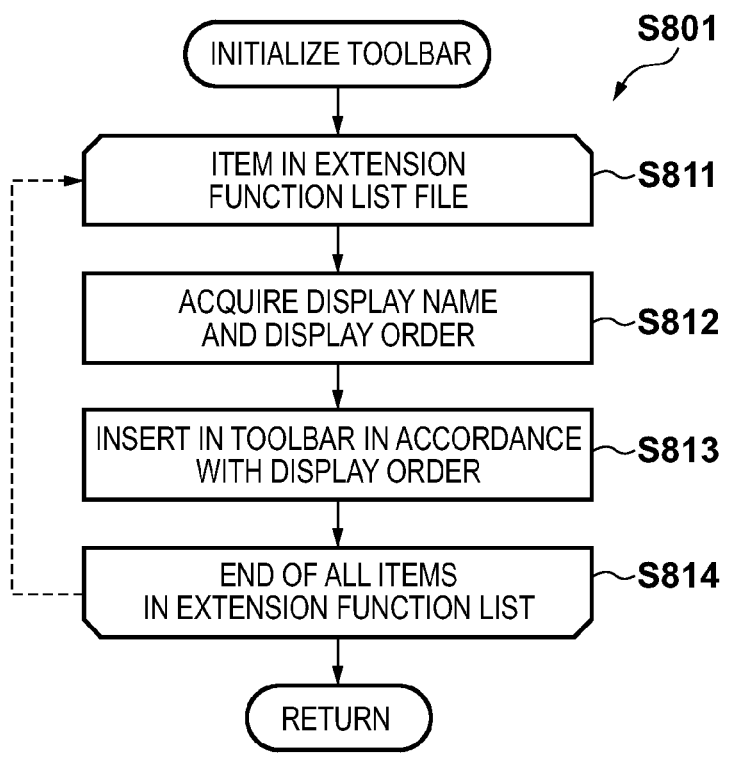

FIG. 12A

```
<?xml version="1.0 encoding="utf-8"?>
<PluginsVersion>                           1211
    <Plugin ID="EDIT_MOV"                         1210
            Version="2.0.0.1"/>            1212
    <Plugin ID="EDIT_RAW"
            Version="2.0.0.1"/>            1220
    <Plugin ID="VIEW_SLIDESHOW"
            Version="1.0.2.4"/>            1230
    <Plugin ID="EDIT_RAW_MOV"
            Version="2.0.0.1"/>            1240
</PluginsVersion>
```

FIG. 12B

```
<?xml version="1.0" encoding="utf-8"?>
<PluginsList>                  411   412   413   414    410
    <Plugin ID="EDIT_MOV"
            Label="Edit Movie" ButtonOrder="dc"
            URL="http://plugins.XX.com/MyApp/EditMovieInstaller.exe"
            InstalledPath="/Root/Plugins/EditMovie.dll" InstalledVersion="1.0.0.1"/>
                                              415      1216     420
    <Plugin ID="EDIT_RAW"
            Label="Edit RAW" ButtonOrder="f"
            URL="http://plugins.XX.com/MyApp/EditRAWInstaller.exe"
            InstalledPath="/Root/Plugins/EditRAW.dll" InstalledVersion="1.0.1.5"/>
                                                                        430
    <Plugin ID="VIEW_SLIDESHOW"
            Label="View Slideshow" ButtonOrder="d"
            URL="http://plugins.XX.com/MyApp/ViewSlideshowInstaller.exe"
            InstalledPath=" " InstalledVersion=" "/>
</PluginsList>         435          1236
```

FIG. 12C

```
<?xml version="1.0" encoding="utf-8"?>
<ActionsList>
    <Action ID="EDIT_MOV"                    501
            Version="1.0.0.1"/>              1250
            TargetList="/Root/Startup/Selection001.xml"/>   503
</ActionsList>
```

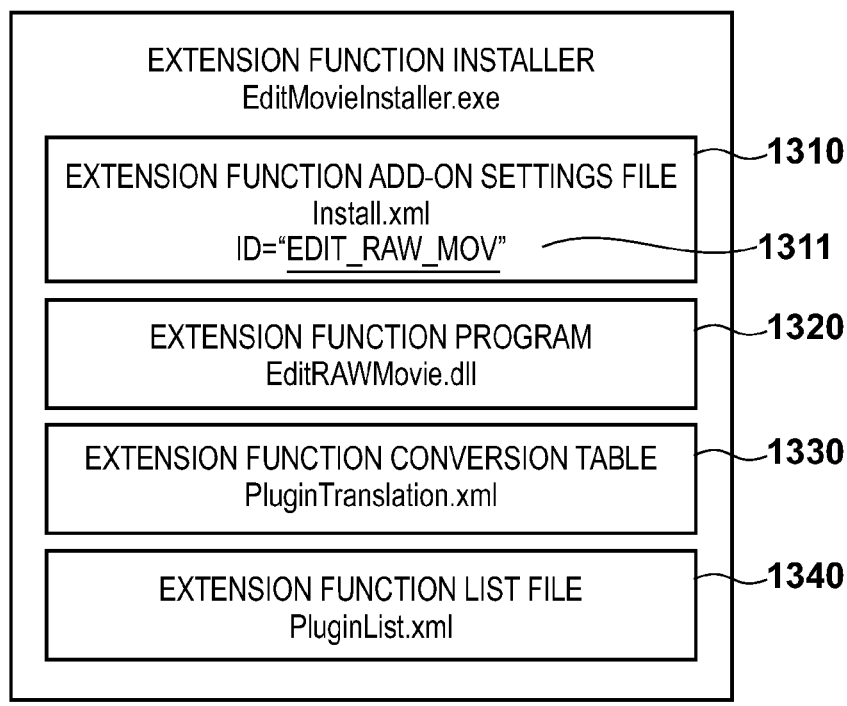

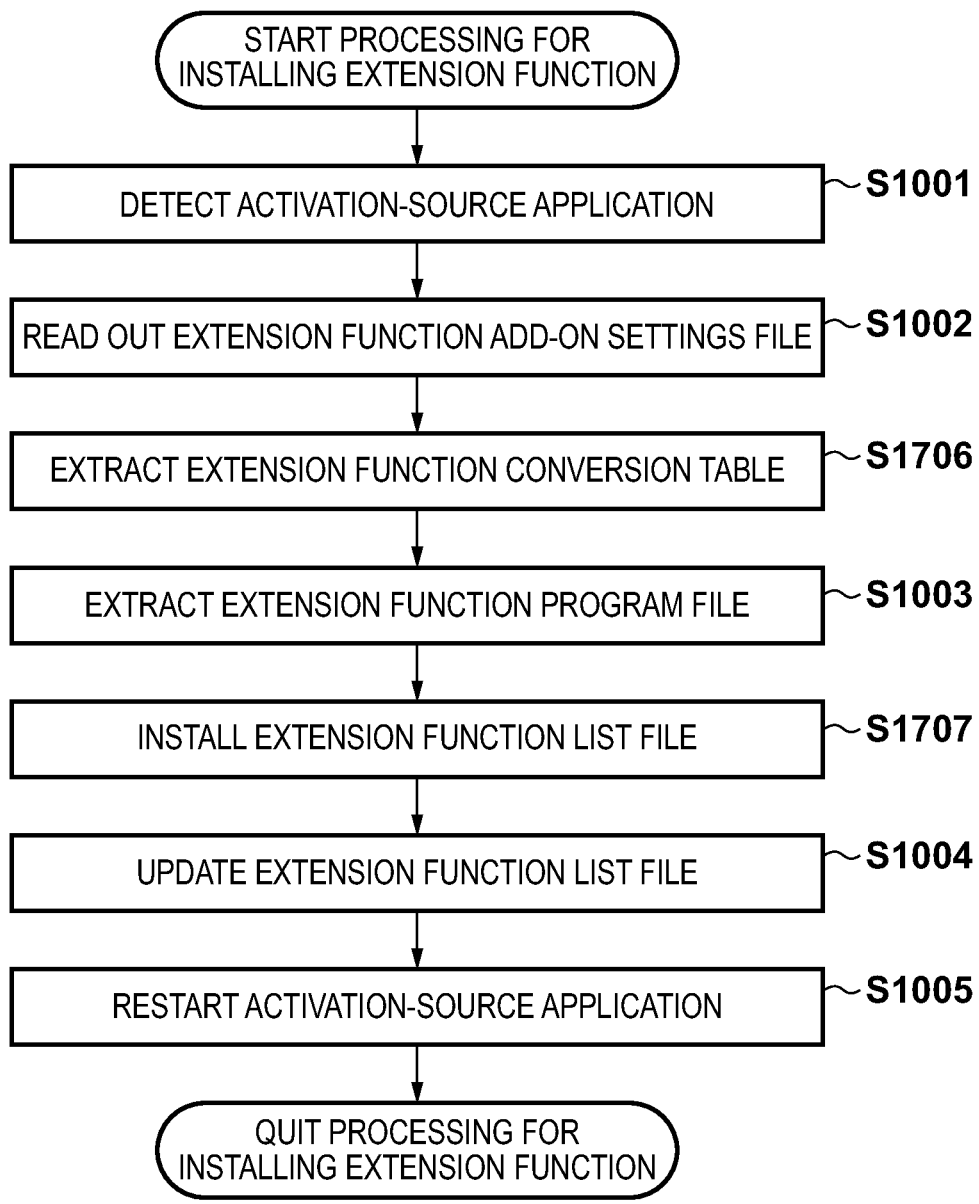

INFORMATION PROCESSING APPARATUS AND CONTROLLING METHOD THEREOF

BACKGROUND OF THE INVENTION

1. Field of the Invention

The present invention relates to an information processing apparatus for updating software automatically, a method of controlling this apparatus and a storage medium storing a program for implementing the control method.

2. Description of the Related Art

Creating software as a program for each of a plurality of functions, initially installing only the program for a basic function in an information processing apparatus and then installing the programs for the remaining functions in the information processing apparatus as necessary is common practice (see the specification of Japanese Patent Laid-Open No. 2005-236507).

In an arrangement in which it is possible to install additional functions, the user operates an application at any desired time, accesses a server to acquire a list of functions capable of being added on and then can install the programs of functions selected from the list. In this case, it is required that the user know beforehand the name and purpose, etc., of the function desired for use. Such an arrangement poses no particular difficulty for an advanced user possessing sufficient know-how. However, for a novice user who does not even possess knowledge as to what kinds of functions are available, a problem which arises is that the user cannot be made aware of the fact that a desired function even exists. Further, in a case where it is necessary to restart software when a plugin is added to the software, the user must interrupt whatever operation he or she is currently performing and start again from the beginning. This is not a user-friendly situation.

SUMMARY OF THE INVENTION

An aspect of the present invention is to provide an information processing apparatus and method of controlling same in which, when software utilized by a user is provided with additional functions or is updated, a sense of discontinuity imposed upon the user during use of the software is reduced.

According to one aspect of the present invention, there is provided a method of controlling an information processing apparatus, comprising: a determining step of determining, during execution of an application program, whether installation of an extension function is necessary based upon a user's operation that has been received; a saving step of saving information, which identifies an extension function whose installation is necessary, in a memory if it has been determined that installation of the extension function is necessary; a terminating step of activating an installer for the extension function whose installation is necessary, and terminating the application program; an activating step of activating the application program in response to completion of installation of the extension function by the installer; and a step of activating the extension function, which has been installed by the installer, in accordance with the activated application program, based upon the identifying information that has been saved in the memory.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating an example of the configuration of a system according to an embodiment of the present invention;

FIG. 2 is a block diagram illustrating an example of the configuration of an information processing apparatus according to the embodiment;

FIGS. 4A to 4D are diagrams illustrating examples of files according to the first embodiment;

FIG. 5 is a diagram illustrating an example of the composition of data of an extension function installer according to the first embodiment;

FIG. 7 is a flowchart illustrating processing by an application when an extension function is activated;

FIG. 8A is a flowchart illustrating initializing processing when an application execution file is executed;

FIG. 8B is a flowchart illustrating processing for initializing a toolbar;

FIGS. 12A to 12C are diagrams illustrating examples of files according to the second embodiment;

FIG. 13 is a diagram illustrating an example of the configuration of an extension function installer according to the second embodiment;

FIG. 14 is a diagram illustrating an example of the composition of an extension function conversion table according to the second embodiment;

FIG. 17 is a flowchart illustrating processing of a movie editing extension function installer according to the second embodiment.

DESCRIPTION OF THE EMBODIMENTS

Figure 3A:
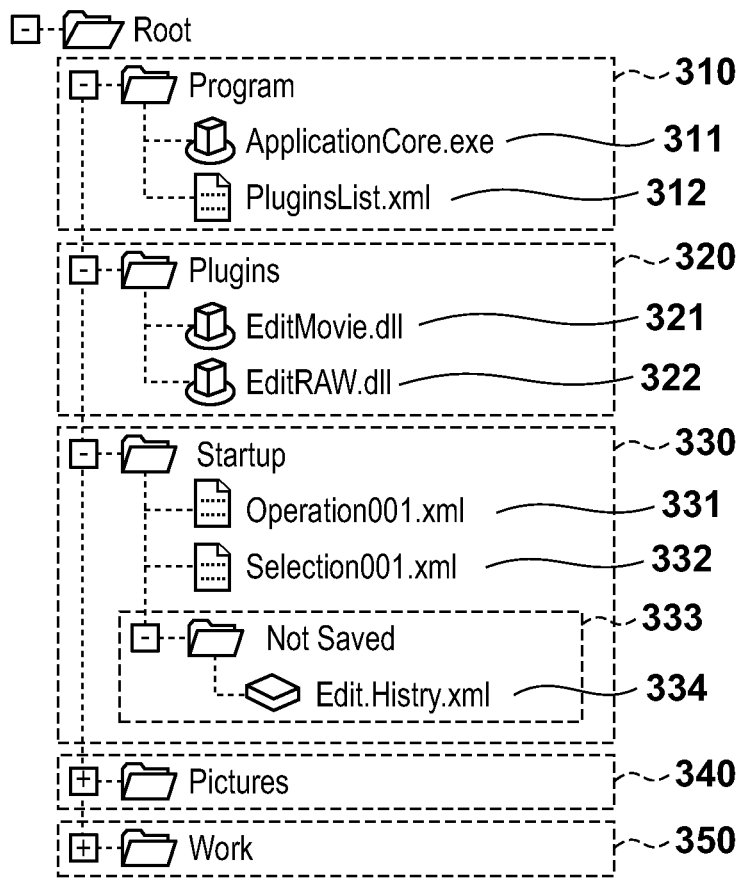
FIGS. 3A and 3B are diagrams illustrating an example of the composition of data within a storage device of a computer and server according to a first embodiment.

Preferred embodiments of the present invention will now be described with reference to the accompanying drawings.

First Embodiment

FIG. 1 illustrates a block diagram of a system according to this embodiment. The system includes a computer 101 and a server 102, which are connected by a network 103.

FIG. 2 illustrates an example of the configuration of an information processing apparatus for implementing the computer 101 and server 102 of this embodiment. The computer 101 and server 102 may each be implemented by a single information processing apparatus, or it may be arranged so that these are implemented by dispersing their functions over a plurality of information processing apparatuses. In a case where implementation is by a plurality of information processing apparatuses, these would be connected by a Local-Area Network (LAN) so as to be capable of communicating with one another. In FIG. 2, a control unit 201, which exercises overall control of an information processing apparatus 200, is a Central Processing Unit (CPU), by way of example. A Read-Only Memory (ROM) 202 stores programs and parameters that will not require to be changed. A Random-Access Memory (RAM) 203 temporarily stores programs and data supplied from an external apparatus. A storage device 204 includes a hard disk or memory card permanently installed in the information processing apparatus 200, or a device removable from the information processing apparatus 200, such as a floppy (registered trademark) disk (FD), an optical disk such as a Compact Disk (CD), a magnetic or optical card, or an IC card.

An operation input interface 205, which accepts various user operations, interfaces an input device such as a pointing device or keyboard 209 for inputting data. A display interface 206 interfaces a display 210 for displaying supplied data or data saved by the information processing apparatus 200. A network interface 207 is an interface for connecting to a network line 211 of the network 103 or the like. An image input interface 208 is an interface for connecting to an image input device 212. The image input device 212 includes devices such as a digital camera, digital video camera and scanner. A system bus 213 is an internal bus that connects the above-mentioned units such that they are capable of communicating with one another.

FIG. 3A illustrates the internal configuration of the storage device 204 of computer 101 in the system of this embodiment. Stored in the storage device 204 is a folder (Program) 310 containing an application execution file. The folder 310 contains an application execution file (ApplicationCore.exe) 311 and an extension function list file (PluginsList.xml) 312. A folder (Plugins) 320 containing an extension function is capable of storing a program file for extending the functionality of the application. For example, in FIG. 3A, the folder 320 contains a movie editing extension function program (EditMovie.dll) 321 and a RAW image editing extension function program (EditRAW.dll) 322. In case of processing executed automatically at startup of the software, a file indicating the details of this processing is recorded in scheduled execution processing recording folder (Startup) 330. A scheduled execution processing recording file (Operation001.xml) 331 and a selected-image list file (Selection001.xml) 332 exist in this folder. An unsaved-data folder (Not Saved) 333, which holds unsaved data from the last time software was started up, also exists in the folder 330. An image editing history file (EditHistory.xml) 334, which contains a history of editing applied to data by a data editing function, exists in the unsaved-data folder 333. A work folder (Work) 350 is a location where the program saves a temporarily generated file at the time of execution. Further, an image data file that has been saved by the user is saved in an image folder (Pictures) 340.

Figure 3B:
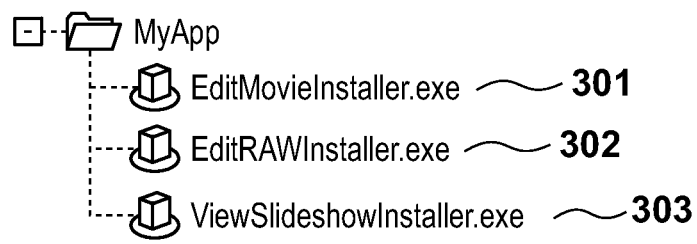

FIG. 3B illustrates the internal configuration of the storage device 204 of server 102. An execution file of an extension function installer to be transferred to and executed by the computer 101 has been stored in the storage device 204 of server 102. For example, in FIG. 3B, a movie editing extension function installer (EditMovieInstaller.exe) 301 has been stored in the storage device 204. Further, a RAW image editing extension function installer (EditRAWInstaller.exe) 302 and a slideshow playback extension function installer (ViewSlideshowInstaller.exe) 303 have been stored in the storage device 204.

Figures 4A, 4B:
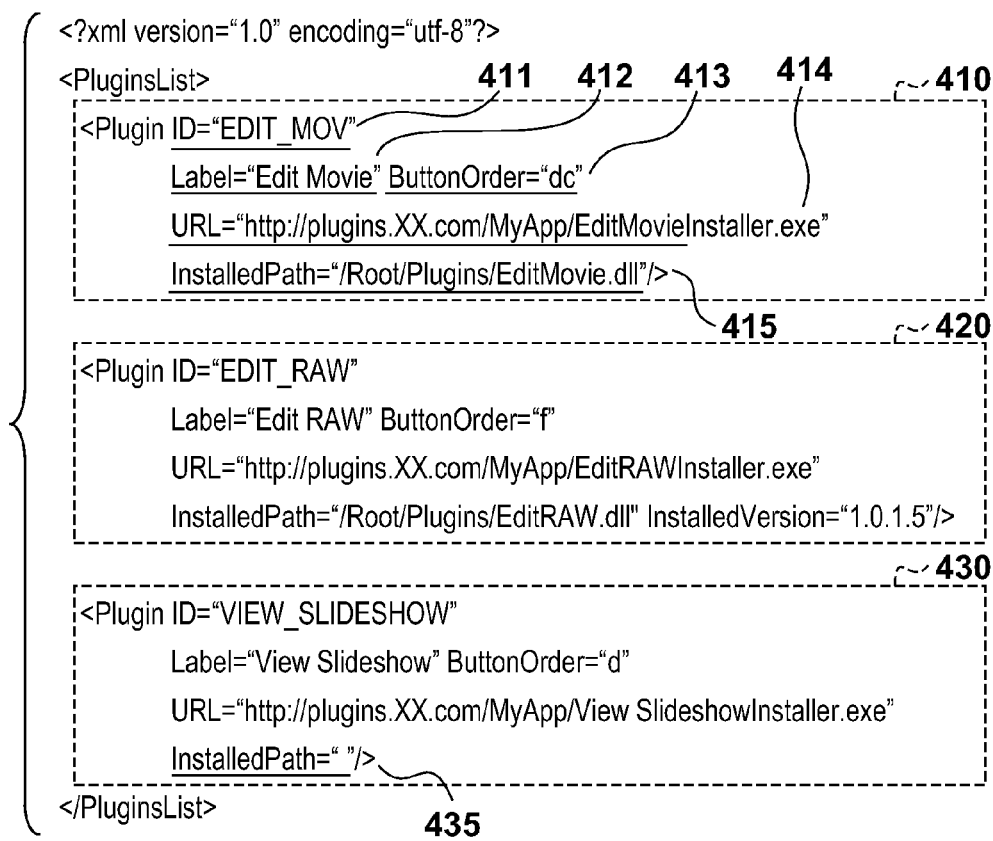

FIG. 4A illustrates an example of the extension function list file 312. A list of extension functions utilizable by the application has been written in the extension function list file 312. In FIG. 4A, three items of extension function information 410, 420 and 430 have been recorded in the file. For example, described in the extension function information 410 are an identifier 411, a display name 412, a display order 413, an acquisition destination 414 and an install destination 415. Described in each of the items of extension function information 420 and 430 also is the corresponding information. With regard to the extension function described in extension function information 430, however, a blank space has been designated for installation destination 435 because this extension function has not yet been installed in the system.

FIG. 4B illustrates an example of the scheduled execution processing recording file 331. Information relating to the function scheduled for execution at the time of application start-up has been recorded in the scheduled execution processing recording file 331. Specifically, an extension function identifier 441 and a selected-image list file name 443 have been recorded.

FIG. 4C illustrates an example of the selected-image list file 332. A file name list of selected images has been recorded in the selected-image list file 332 and the list represents images that become target images when the function is executed. In the example of FIG. 4C, the paths of three images 451, 452 and 453 have been recorded in the file.

FIG. 4D illustrates an example of the image editing history file 334. Editing details regarding image files that have been edited but not yet saved have been recorded in the image editing history file 334. The control unit 201 restores unsaved data by executing the edited content described in the image editing history file 334 at start-up of the application. Recorded in the image editing history file 334 shown in FIG. 4D are editing history 460 with respect to a file IMG_0025.JPG and editing history 470 with respect to a file IMG_0029.JPG. Recorded in the editing history 460 with respect to the file IMG_0025.JPG are an editing-target file name 461 and one or more editing operations regarding this file. In the example of FIG. 4D, an operation 462 and an operation 465 have been recorded. Described in the operation 462 are an editing operation identifier 463 and an editing operation parameter 464. Similarly, an editing operation identifier 466 and an editing operation parameter 467 are described in operation 465.

The composition of the execution file of the extension function installer that has been stored in the server 102 will now be described with reference to FIG. 5 taking as an example the movie editing extension function installer 301. Embedded within the movie editing extension function installer 301 are an extension function add-on settings file 510 and an extension function program 520. These are extracted and used at the time of execution. An identifier 511 of an extension function to be added on has been recorded in the extension function add-on settings file 510.

Figure 6A:
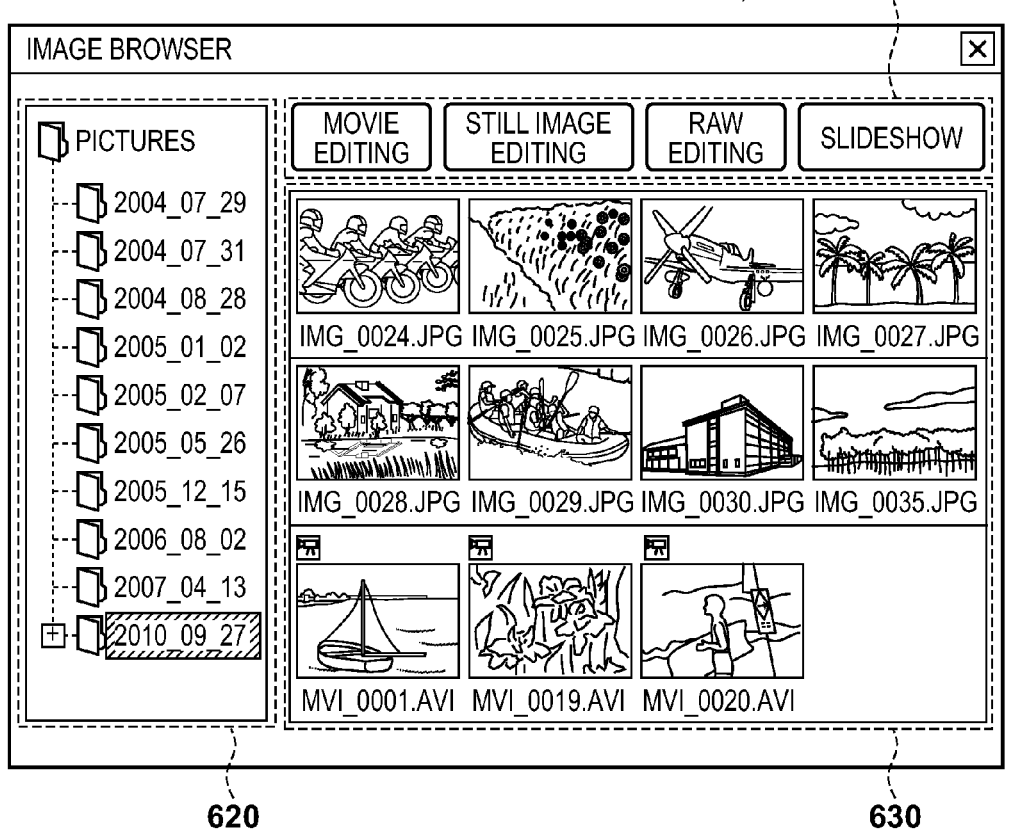
FIGS. 6A and 6B are diagrams illustrating examples of display screens presented when an application execution file is executed.

FIG. 6A illustrates an example of a display screen 600 displayed by an application function implemented as a result of the control unit 201 of computer 101 executing the application execution file 311. The screen 600 is composed of three sections, namely a toolbar area 610, an image folder list area 620 and an in-folder image list display area 630. A list of all folders that exist in an image folder 340 is displayed in the image folder list area 620. A list of image files that exist in a selected folder is displayed in the in-folder image list display area 630. A list of processing executable with regard to an image selected in the in-folder image list display area 630 is displayed in the toolbar area 610. In response to the user clicking on a button in the toolbar, the control unit 201 can execute the process that corresponds to the clicked button. The toolbar area 610 is provided by the application function as a user interface that can be designated without distinguishing between an already installed extension function and an extension function that has not yet been installed.

Figure 6B:
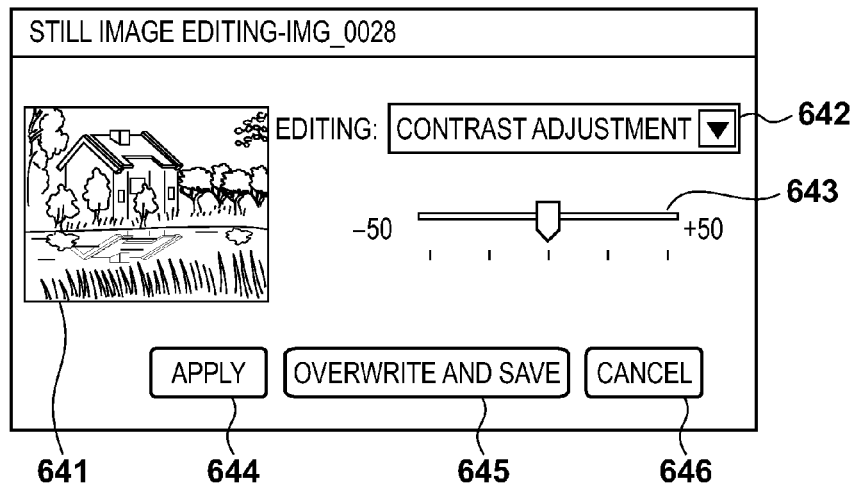

FIG. 6B illustrates an example of a screen of an editing window 640 displayed on the display 210 of computer 101 by the application function. The editing window 640 is displayed when a "STILL-IMAGE EDIT" button in toolbar area 610 is selected following selection of one image in the in-folder image list display area 630. Situated in the editing window 640 are an image preview 641, an editing function selection list box 642, an editing operation parameter designation control 643, an application button 644, a save button 645 and a cancel button 646. The indication on the editing operation parameter designation control 643 is changed automatically by the item selected in the editing function selection list box 642 so that a parameter setting conforming to the editing content can be performed.

Next, reference will be had to the flowchart of FIG. 7 to describe the flow of processing when the user clicks a button in the toolbar area 610 and the control unit 201 activates an extension function in accordance with the application. The processing of this flowchart is executed as a result of the control unit 201 running programs such as an application and operating system that have been stored in the ROM 202 or storage device 204.

First, at step S701, the control unit 201 generates the selected-image list file 332 from the image list selected in the in-folder image list display area 630. Next, at step S702, the control unit 201 acquires the install destination 415 of the executed extension function from the extension function list file 312 and checks to determine whether the destination is empty. If the install destination is not empty, then this extension function has already been installed. Therefore, at step S703, the control unit 201 delivers the selected-image list file 332 to the extension function and activates the function. This completes the processing for activating the extension function.

If the install destination is empty, this means that this extension function has not been installed and the control unit 201 (application function) therefore executes processing for installing the extension function. Specifically, at step S704, the control unit 201 records the identifier of the activated extension function and the selected-image list file name in the scheduled execution processing recording file 331 and then outputs the result to the scheduled execution processing recording folder 330. Then, at step S705, using the acquisition destination 414 of the extension function that has been recorded in the extension function list file 312, the control unit 201 downloads the extension function installer from the server 102 to the work folder 350. If the download succeeds, the control unit 201 activates the extension function installer at step S706. Since the activated extension function installer applies an update to the application, operation of the extension function installer requires that the application be halted. At step S707, therefore, the control unit 201 quits the application without waiting for quitting of the activated extension function installer. It should be noted that the details of processing by the extension function installer will be described later with reference to FIG. 10.

Next, reference will be had to FIG. 8A to describe the overall flow of initializing processing when the control unit 201 executes the application execution file 311 and restarts the application after it quits the application at step S707 in order to install the extension function. The processing of this flowchart also is executed as a result of the control unit 201 running programs such as an application and operating system that have been stored in the ROM 202 or storage device 204.

First, at step S801, the control unit 201 executes processing for initializing the toolbar. The control unit 201 then displays an application screen at step S802 and restores unsaved data at step S803. Thereafter, at step S804, the control unit 201 executes the processing that is scheduled for execution.

Next, the flow of toolbar initializing processing at step S801 will be described in detail with reference to FIG. 8B. Here the items in the extension function list file 312 are cycled through in a loop from step S811 to step S814. First, at step S812, the control unit 201 acquires a display name and a display order from the extension function list file 312. At step S813, the control unit 201 adds the acquired display-name item to the acquired display-order position in the toolbar. When the control unit 201 has added display-name items to the toolbar with regard to all items, it terminates the toolbar initializing processing.

Next, the flow of processing for restoring unsaved data at step S803 will be described in detail with reference to FIG. 8C. The items set forth below are repeated from step S831 to step S837 with regard to each image file that has been recorded in the image editing history file 334. First, at step S832, an image file that has been designated is opened by the control unit 201 in the editing window 640. Furthermore, with respect to opened image files, the control unit 201 repeats the processing below from step S833 to step S836 with regard to the entire editing history concerning each image file currently designated.

First, at step S834, the control unit 201 acquires, from the editing history file, the editing operation identifier and editing operation parameter of the editing history that is the object of processing in the loop. At step S835, the control unit 201 executes the editing function of the designated identifier in accordance with the acquired editing operation parameter. If execution of the entire editing history is finished, then the operation of this image file is completed at step S836. If operation is completed for all image files, then the control unit 201 exits at step S837 and completes the processing for restoring unsaved data.

Figure 8C:
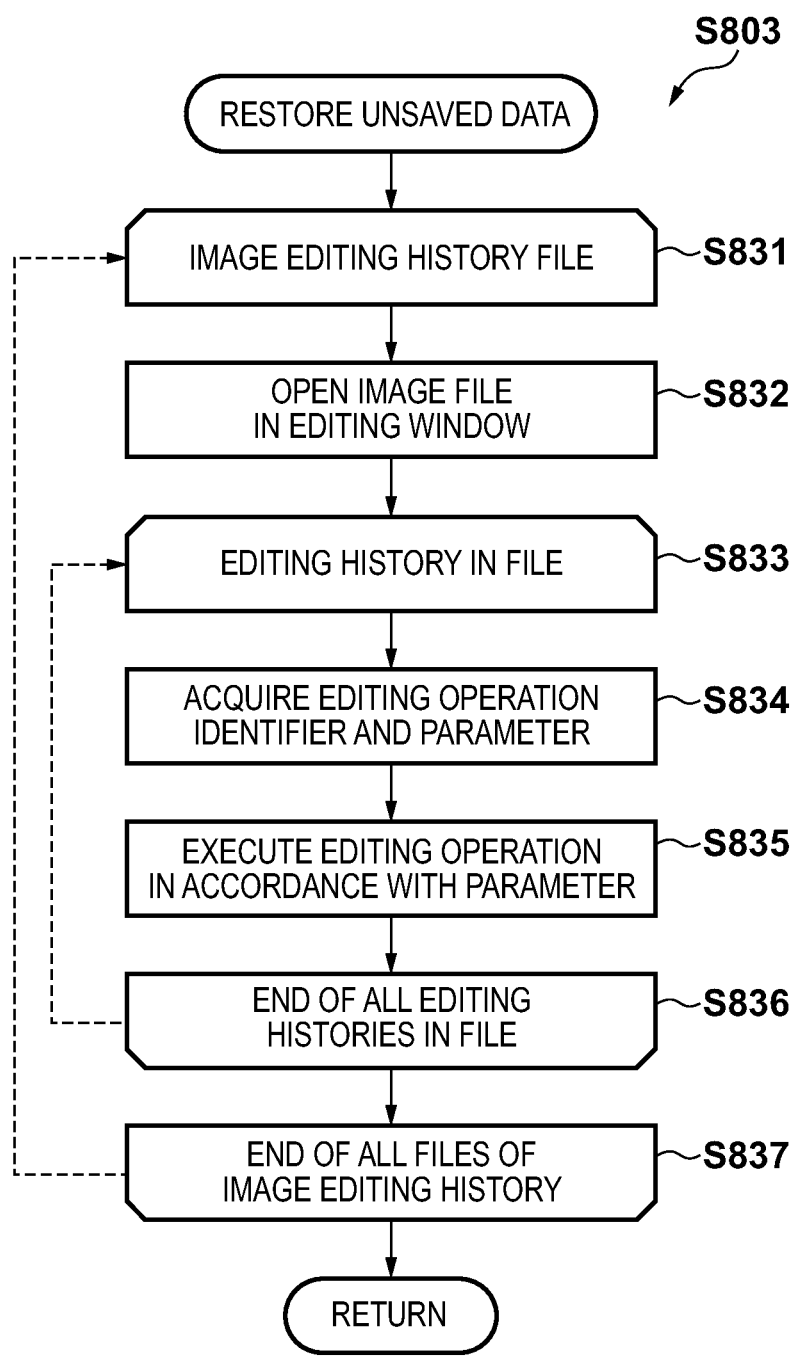
FIG. 8C is a flowchart illustrating processing for restoring data that has not been saved.
Figure 8D:
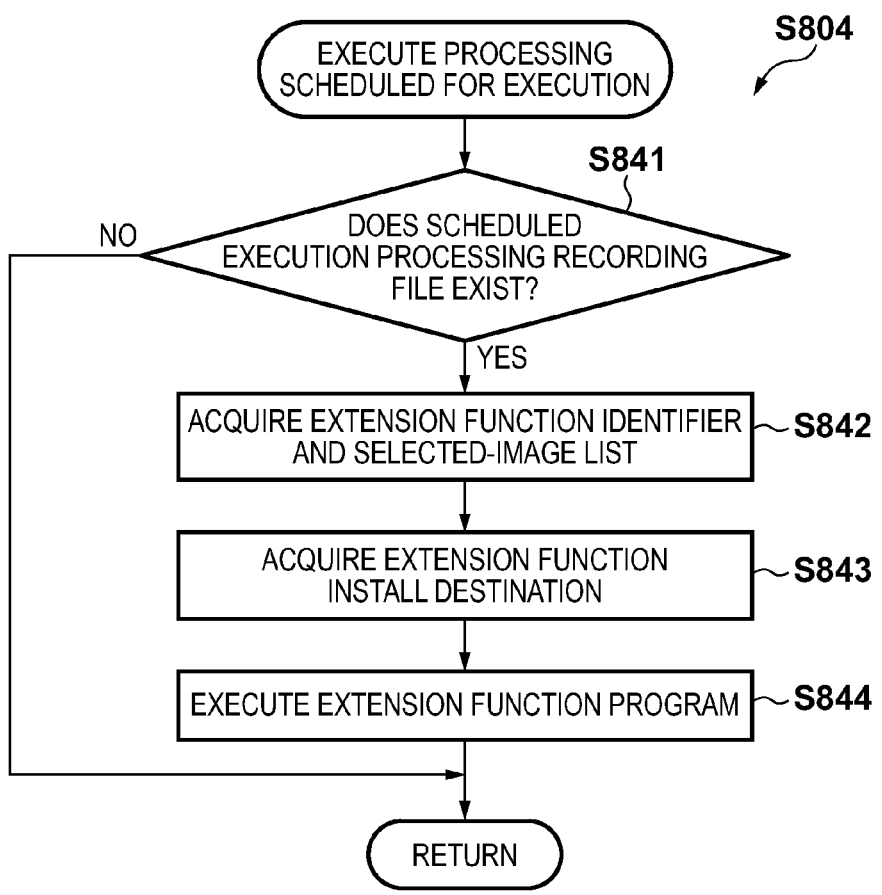
FIG. 8D is a flowchart illustrating execution of processing that is scheduled for execution according to the first embodiment.

Next, reference will be had to FIG. 8D to describe in detail the execution at step S804 of processing that is scheduled for execution. First, at step S841, the control unit 201 checks to determine whether the scheduled execution processing recording file 331 exists and, if it does not exist, quits execution of processing scheduled for execution without executing any processing. It should be noted that if execution of an application has been quit owing to installation of an extension function, the above-mentioned step S704 will have been executed and, hence, the scheduled execution processing recording file 331 will exist without fail. If the scheduled execution processing recording file 331 exists, then the control unit 201 acquires the paths of the extension function identifier and selected-image list file from the scheduled execution processing recording file 331 at step S842. Next, at step S843, the control unit 201 acquires the install destination corresponding to the acquired extension function identifier from the extension function list file. At step S844, the control unit 201 delivers the selected-image list file to the extension function program at the acquired install destination and starts up the program. When start-up of the extension function program finishes, the control unit 201 terminates execution of processing scheduled for execution.

Figure 9A:
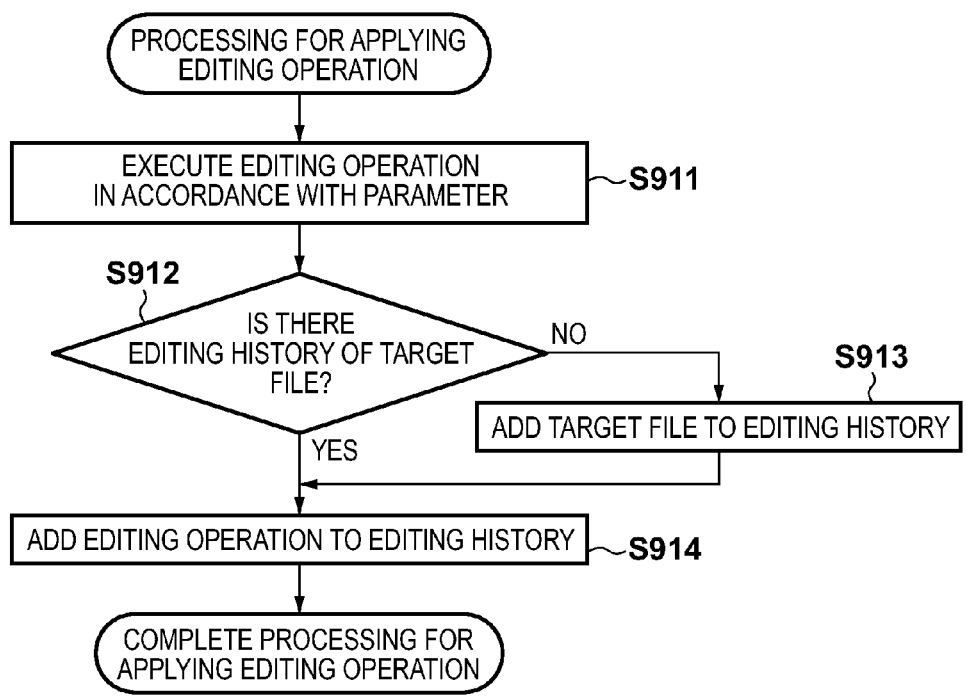
FIG. 9A is a flowchart illustrating processing executed when an application button of an editing window is clicked.

Next, reference will be had to FIG. 9A to describe the flow of processing executed by the control unit 201 in a case where the user has clicked the application button 644 in the editing window 640. The processing of this flowchart also is implemented as a result of the control unit 201 executing a program stored in the ROM 202 or storage device 204.

At step S911, the control unit 201 executes the designated editing function in accordance with an editing operation parameter designated through editing dialog. Next, at step S912, the control unit 201 determines whether the image editing history file contains editing history corresponding to the image file currently being edited. If editing history does not exist, the control unit 201 adds the item of the image file undergoing editing to the image editing history file at step S913. Then, at step S914, the control unit 201 adds the presently applied editing operation identifier and editing operation parameter to the image editing history file at step S914. Thus, the history of editing processing is saved with regard to image data that is in the course of being editing (namely image data not yet saved).

If the control unit 201 determines at step S912 that editing history corresponding to an image file undergoing editing exists in the image editing history file, then the control unit 201 adds the presently applied editing operation identifier and editing operation parameter to the image editing history file at step S914.

Figure 9B:
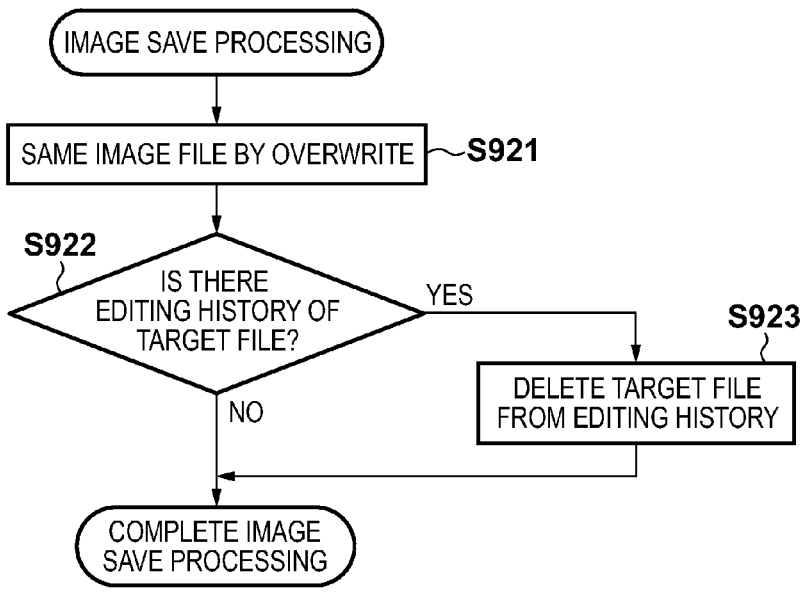
FIG. 9B is a flowchart illustrating processing executed when a save button is clicked.

Next, reference will be had to FIG. 9B to describe the flow of processing executed when the user has clicked the save button 645 in the editing window 640. The processing of this flowchart also is implemented as a result of the control unit 201 executing a program stored in the ROM 202 or storage device 204. At step S921, the control unit 201 saves the edited image by writing it over the image in the file of the same name in the image folder 340 at step S921. Next, at step S922, the control unit 201 determines whether the image editing history file contains editing history corresponding to the image file currently being edited. If no editing history exists, the control unit 201 completes image save processing. If editing history does exist, then, at step S923, the control unit 201 deletes the description of the image file undergoing editing from the image editing history file and completes image save processing.

Figure 10:
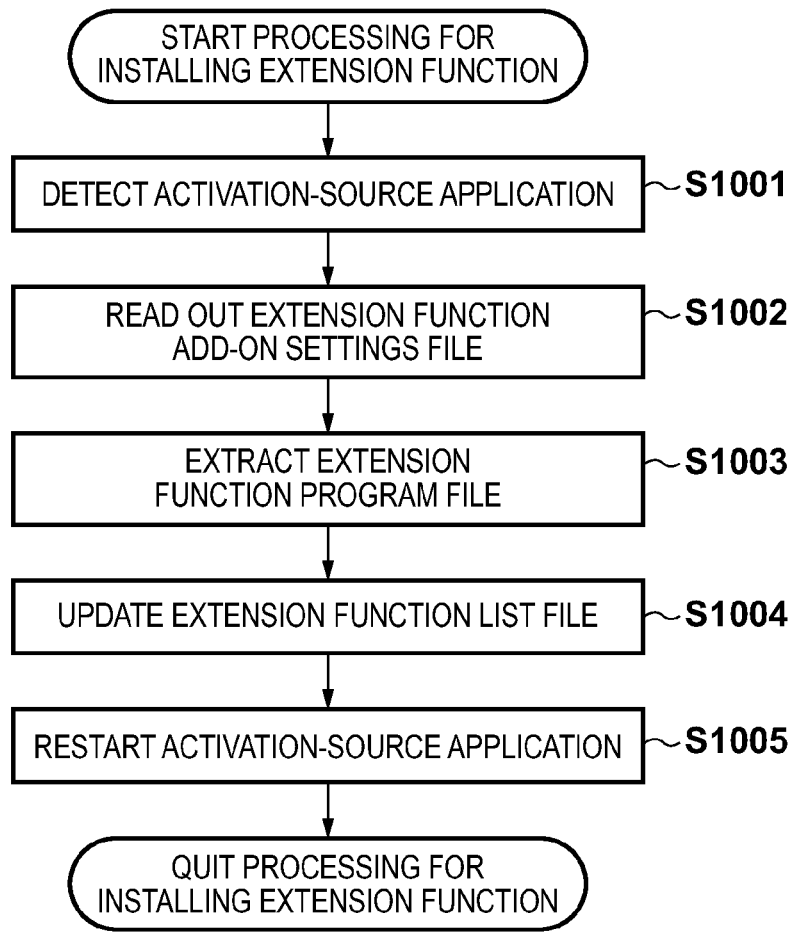
FIG. 10 is a flowchart illustrating processing by an extension function installer according to the first embodiment.

Next, the flow of processing by the movie editing extension function installer 301 will be described with reference to FIG. 10. The processing of this flowchart also is implemented as a result of the control unit 201 executing a program stored in the ROM 202 or storage device 204.

At step S1001, the control unit 201 detects the path name of the application that activated the movie editing extension function installer 301. Next, at step S1002, the control unit 201 writes the identifier 511 of the extension function, which has been embedded in the file of the movie editing extension function installer 301, to memory from the extension function add-on settings file 510. Then, at step S1003, the control unit 201 extracts the extension function program 520 that has been embedded in the movie editing extension function installer 301 and saves it in the folder 320 containing the extension function. At step S1004, the control unit 201 updates the extension function list file 312. Specifically, the control unit 201 records the install path in the item having the identifier 511 of the extension function extracted at step S1002. Finally, at step S1005, the control unit 201 restarts the originally launched application detected at step S1001 and then exits the processing for installing the extension function.

The preservation of unsaved data when updating is performed is implemented by saving an extension function identifier and an editing operation parameter in the image editing history file 334. However, this does not impose a limitation. For example, there is also a method of saving image data per se, which is the final result, in a file. In this case, instead of executing editing history again during restoration processing, the image data itself is read in from the file. Alternatively, instead of using the image editing history file, a conceivable method is to arrange it so that, in a case where the user is about to close the editing window 640 under circumstances in which editing has not been saved, a warning message is displayed and the user is not allowed to perform the operation for closing the editing window 640. In this case, if an application is to be quit in order to perform updating, the above-mentioned warning message will be displayed and quitting of the application will not be possible in a state in which saving of data is not performed using the editing window 640. As a result, updating cannot be executed. This means that from the start, no consideration need be given to the preservation of unsaved data at the time of updating. It may be arranged so that the warning message allows the user to select to save or to discard an as yet unsaved image undergoing editing.

Thus, in accordance with the first embodiment as described above, the installation of an extension function, the quitting of an application program and the reactivation thereof are carried out automatically even in a case where installation of an extension function is made necessary by a user operation. Further, when an application program is reactivated, operation is restored to that in effect at the time of the user operation and, as a result, the user does not sense any discontinuity in operation.

Second Embodiment

Another embodiment of the present invention will now be illustrated. This embodiment provides a system similar to that of the first embodiment described above and additionally furnishes a function whereby an already installed extension function is updated to a new version thereof. This embodiment will be described on the premise that the movie editing extension function and RAW image editing extension function have been integrated into a single function in the new version and thus form a movie/RAW image editing extension function. The configuration of the system in this embodiment is the same as that of the first embodiment and is as shown in FIG. 1. The configuration of the system, therefore, is not described again. Further, the internal composition of the storage device 204 of computer 101 in the system of this embodiment also is the same as that of the first embodiment.

Figure 11:
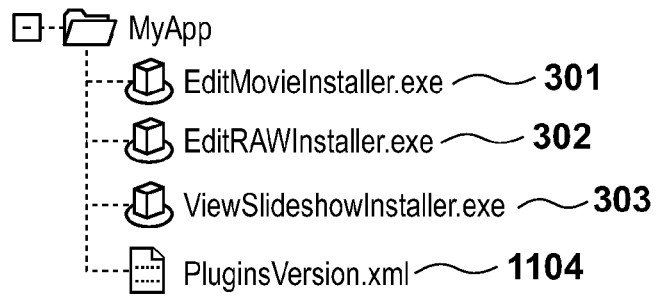
FIG. 11 is a diagram illustrating an example of the composition of data within a storage device of a server according to a second embodiment.

FIG. 11 illustrates the internal composition of the storage device 204 of server 102 in this embodiment. In the same way as the first embodiment, an execution file of an extension function installer to be transferred to and executed by the computer 101 has been stored in the storage device 204 of server 102. For example, in FIG. 11, movie editing extension function installer (EditMovieInstaller.exe) 301 has been stored in the storage device 204. Further, RAW image editing extension function installer (EditRAWInstaller.exe) 302 and slideshow playback extension function installer (ViewSlideshowInstaller.exe) 303 have been stored in the storage device 204. In addition, an extension function version list file (PlugInVersion.xml) 1104 exists in the storage device.

In this embodiment, it is assumed that the movie editing extension function and RAW image editing extension function have been integrated into a single function in the new version. This means that a movie/RAW image editing extension function is installed regardless of which of the movie editing extension function installer 301 or RAW image editing extension function installer 302 is installed.

FIG. 12A illustrates an example of the extension function version list file 1104 that exists in the server 102. A version list of all extension function program versions placed in the server 102 has been recorded in the extension function version list file 1104. Specifically, extension function version information 1210 corresponding to the movie editing extension function installer 301 has been recorded in the file 1104. Further, extension function version information 1220 corresponding to the RAW image editing extension function installer 302 and extension function version information 1230 corresponding to the slideshow playback extension function installer 303 have been recorded. An identifier 1211 and version 1212 of the extension function have been recorded in the extension function version information 1210. Similarly, identifiers and versions are recorded in the extension function version information 1220 and extension function version information 1230. Further, an identifier and version have been recorded in information 1240 with regard to the movie/RAW image editing extension function.

FIG. 12B illustrates an example of the extension function list file 312 according to this embodiment. Although the basic composition of the extension function list file 312 is the same as that of the first embodiment, here the recorded extension function information additional includes an installed version 1216 in addition to the identifier 411, display name 412, display order 413, acquisition destination 414 and install destination 415. Described in each of the items of extension function information 420 and 430 also is the corresponding information. With regard to the extension function described in extension function information 430, however, a blank space has been designated for installed version 1236 in addition to installation destination 435 because this extension function has not yet been installed in the system.

FIG. 12C illustrates an example of the scheduled execution processing recording file 331. Information relating to the function scheduled for execution at the time of application start-up has been recorded in the scheduled execution processing recording file 331. In addition to an extension function identifier 501 and a selected-image list file name 503 similar to those of the first embodiment, an extension function version 1250 has been recorded in this file. With regard to examples of the selected-image list file 332 and image editing history file 334 in this embodiment, these are the same as in the first embodiment and are illustrated in FIGS. 4C and 4D, respectively. They are not described again here.

The composition of the execution file of the extension function installer of this embodiment will now be described with reference to FIG. 13 taking as an example the movie editing extension function installer 301. Embedded within the movie editing extension function installer 301 are an extension function add-on settings file 1310, an extension function program 1320, an extension function conversion table 1330 and an extension function list file 1340. These are extracted and used at the time of execution. An identifier 1311 of an extension function to be added on has been recorded in the extension function add-on settings file 1310.

Next, the composition of the extension function conversion table 1330 will be described with reference to FIG. 14. The extension function conversion table 1330 includes a list of conversion items for a case where an extension function identifier changes when an extension function activated prior to updating is activated in the updated version. That is, extension functions before and after updating have been recorded in correlated form in the extension function conversion table 1330. In the example of FIG. 14, the table contains two conversion items 1410 and 1420. The conversion item 1410 includes a pre-conversion extension function identifier 1411, a pre-conversion extension function version 1412 and a post-conversion extension function identifier 1413. These indicate that, in a case where a version less than version 2.0.0.1 of the extension function identifier "EDIT_MOV" has been activated before updating, the extension function identifier "EDIT_RAW_MOV" is activated after updating.

In the case of this embodiment, EDIT_MOV and EDIT_RAW change to EDIT_RAW_MOV and therefore a description of the kind mentioned is required in the extension function conversion table 1330. Similarly, with regard to conversion item 1420, it has been recorded that, in a case where a version less than version 2.0.0.1 of the extension function identifier "EDIT_RAW" has been activated before updating, the extension function identifier "EDIT_RAW_MOV" is activated after updating. With regard to an example of the display screen when the application execution file 311 is executed and the example of the screen of the editing window 640, these are the same as in the first embodiment and as shown in FIGS. 6A and 6B, respectively.

Figure 15:
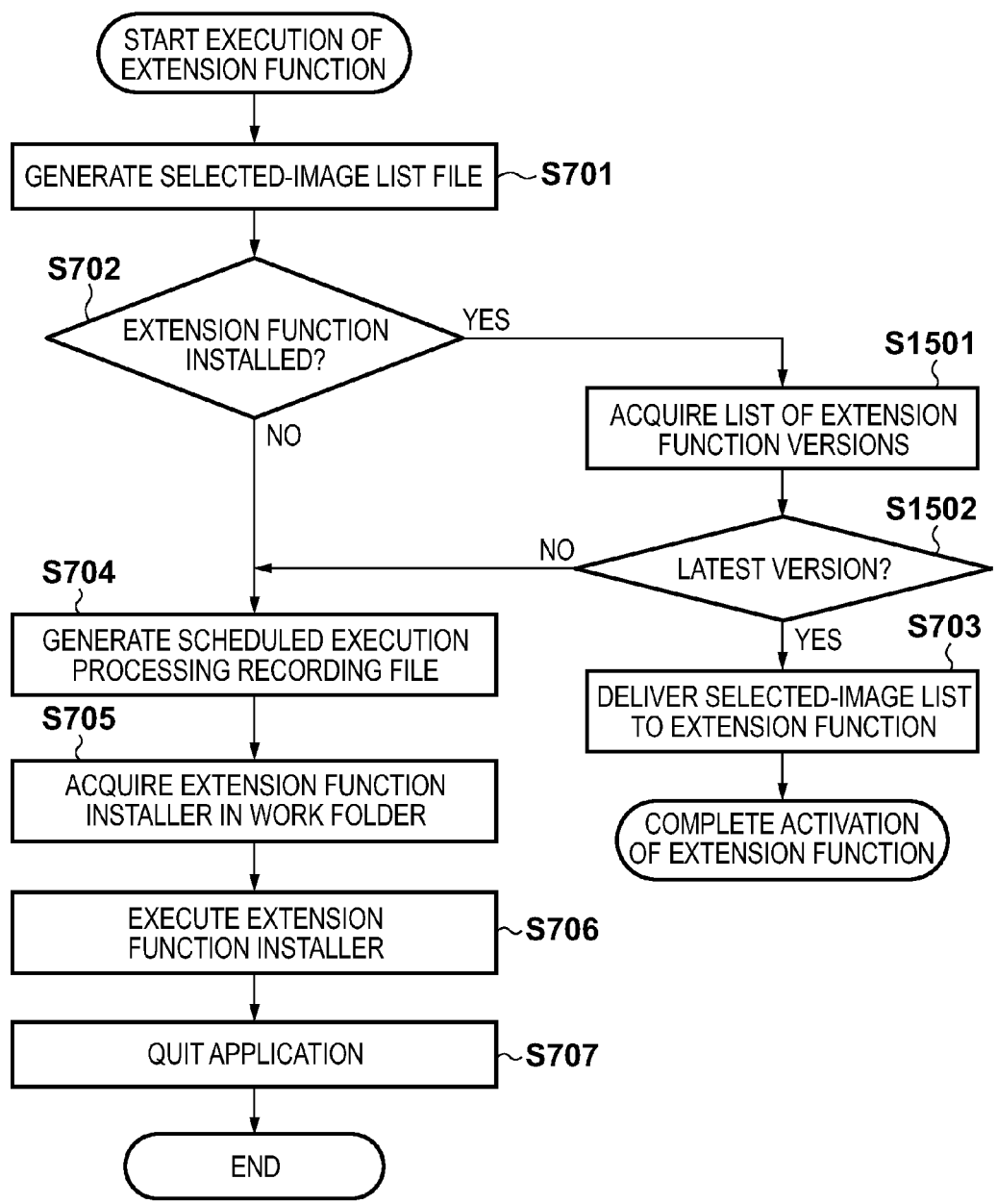
FIG. 15 is a flowchart illustrating processing executed when an extension function is executed according to the second embodiment.

Next, reference will be had to FIG. 15 to describe the flow of processing when the control unit 201 executes an extension function of an application. FIG. 15 is a flowchart obtained by adding several additional processing steps to the processing of FIG. 7 described in the first embodiment. At step S702, the control unit 201 acquires the install destination 415 and, if the destination is not empty, acquires the extension function version list file 1104 at step S1501. At step S1502, the control unit 201 compares the extension function version list file 1104 acquired at step S1501 and the version 1212 of the already installed extension function to thereby judge whether updating is required or not. If the versions are identical, then updating is unnecessary because the already installed extension function is the latest version. The control unit 201 activates the latest extension function at step S703. If the versions are different, then updating the extension function is required and processing proceeds to step S704.

With regard to the flow of overall initializing processing, the flow of toolbar initializing processing and the flow of unsaved-data restoration processing executed when the application execution file 311 is executed, these processing flows are similar to those shown in FIGS. 8A to 8C of the first embodiment.

Figure 16:
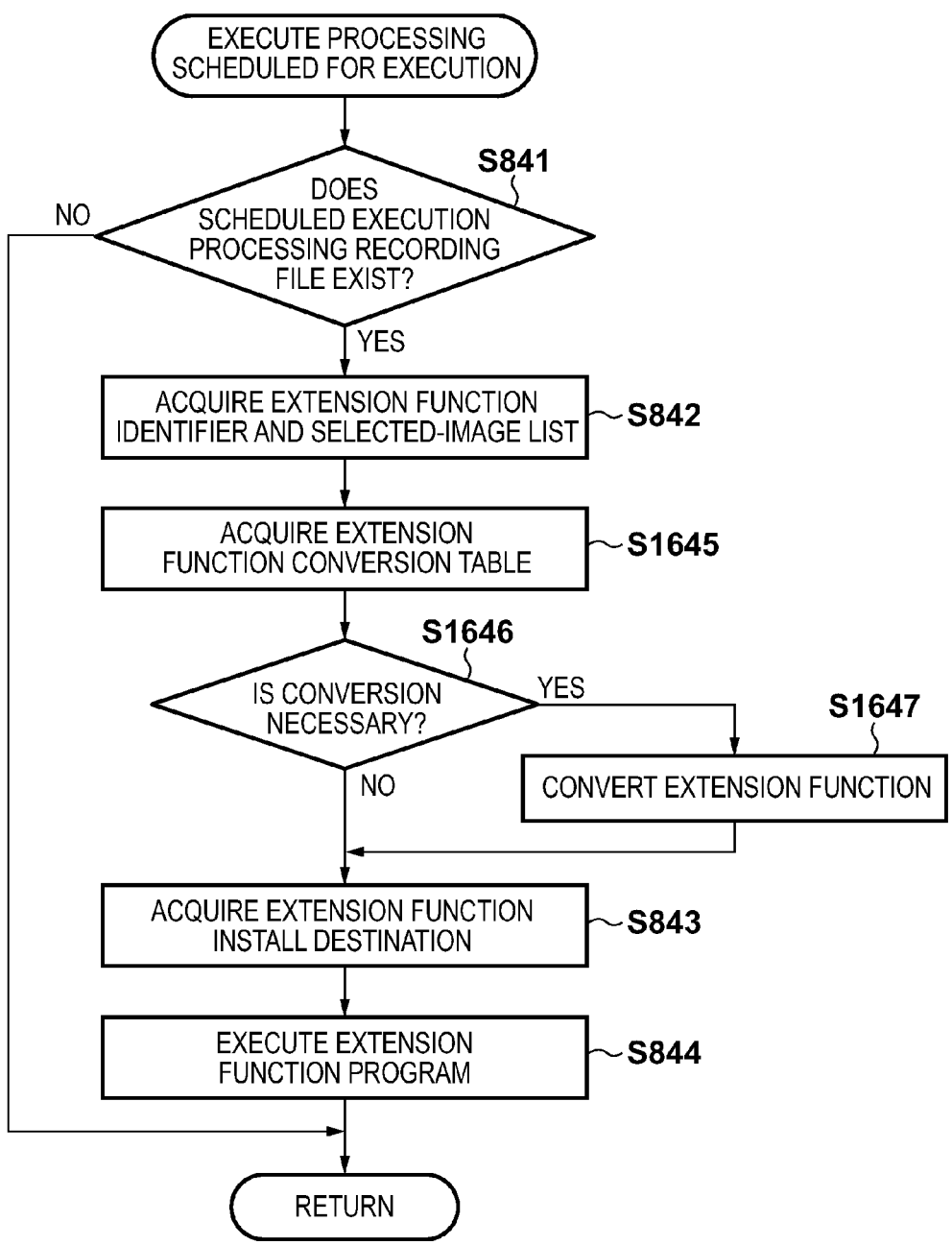
FIG. 16 is a flowchart illustrating execution of processing that is scheduled for execution according to the second embodiment.

Next, reference will be had to FIG. 16 to describe execution of processing scheduled for execution according to the second embodiment. In this embodiment, processing for converting the extension function is added between steps S842 and S843 in FIG. 8D. Specifically, after execution of the processing of step S842, the control unit 201 acquires the extension function conversion table 1330, described earlier in conjunction with FIG. 14, at step S1645. Next, based upon the extension function identifier acquired at step S842 and the extension function conversion table 1330, the control unit 201 determines at step S1646 whether it is necessary to convert the extension function identifier that has been recorded in the scheduled execution processing recording file 331. If conversion is necessary, the control unit 201 executes conversion processing at step S1647 and then proceeds to step S843. If conversion is not necessary, then processing proceeds to step S843 as is. By executing such processing, even if the extension function identifier is changed owing to updating the extension function, the extension function after the change can be activated automatically following updating. It should be noted that the flows of processing when the application button and save button in the editing window 640 are clicked are similar to those of the first embodiment (see FIGS. 9A and 9B).

Next, the difference between the processing flow of movie editing extension function installer 301 and the flow of processing of FIG. 10 in the first embodiment will be described with reference to FIG. 17. In this embodiment, after the extension function add-on settings file 510 is read out at step S1002, the control unit 201 executes processing for extracting the extension function conversion table 1330 at step S1706. This is used in the execution of processing that is scheduled for execution in FIG. 16. Further, before the extension function list file 312 is updated at step S1004, the control unit 201 installs the extension function list file 1340 at step S1707. The reason for this is that addition and deletion of items in the extension function list file 1340 becomes necessary owing to updating the extension function. For example, in FIG. 12B, the extension function list file 312 in which the items of extension function information 410 (EDIT_MOV) and extension function information 420 (EDIT_RAW) are have been deleted and the extension function information of EDIT_RAW_MOV has been registered is generated.

Thus, in accordance with the second embodiment as set forth above, the effects of the first embodiment are supplemented by the fact that updating of an extension function can be performed automatically and without the user being made aware of any discontinuity in operation. That is, the adding on and updating of software functions utilized by the user can be performed without interrupting a series of user operations during use of the software.

Although the present invention has been described in detail based upon preferred embodiments thereof, the present invention is not limited to these specific embodiments and various forms of the present invention that do not depart from the gist thereof are covered by the present invention. Portions of the foregoing embodiments may be combined appropriately. Further, the present invention is implemented by executing the following processing: Specifically, the processing includes supplying software (a program) for implementing the functions of the foregoing embodiments to a system or apparatus via a network or various storage media, and reading out and executing the program by a computer (or CPU or MPU or the like) of the system or apparatus.

In the embodiments of the present invention, an example is described in which an application function has an image editing function as a data editing function. However, data to undergo processing is not limited to image data. For example, the present invention is similarly applicable to audio data.

In accordance with the present invention described above, the adding on and updating of software functions utilized by the user can be performed without interrupting a series of user operations during use of the software.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent This application claims the benefit of Japanese Patent Application No. 2011-160305, filed Jul. 21, 2011, which is hereby incorporated by reference herein in its entirety.

What is claimed is:

1. A method of controlling an information processing apparatus, comprising:
   a determining step of determining, during execution of an application program, whether installation of an extension function is necessary based upon a user's operation that has been received;
   a saving step of saving information, which identifies an extension function whose installation is necessary, in a memory if it has been determined that installation of the extension function is necessary;
   a terminating step of activating an installer for the extension function whose installation is necessary, and terminating the application program;
   an activating step of activating the application program in response to completion of installation of the extension function by the installer; and
   a step of activating the extension function, which has been installed by the installer, in accordance with the activated application program, based upon the identifying information that has been saved in the memory,
   wherein if data that is in the course of being edited by a data editing function exists, then, at said terminating step, the application program is terminated after the user confirms that editing processing has been completed.

2. The method according to claim 1, wherein at said saving step, information, which identifies an extension function whose installation is necessary and data that is the object of processing by this extension function, is saved in the memory; and
   at said step of activating the extension function, the installed extension function is activated and the data that is the object of processing is processed based upon the identifying information.

3. The method according to claim 1, wherein the application program currently being executed saves a history of editing processing with regard to data in the course of being edited by the data editing function; and
   at said step of activating the application program, status in the course of editing is restored in accordance with the history of editing processing.

4. The method according to claim 1, wherein if data that is in the course of being edited by the data editing function exists, then, at said saving step, the data that is in the course of being edited is saved in the memory; and
   at said step of activating the application program, status in the course of editing is restored by reading out the data that is in the course of being edited.

5. The method according to claim 1, further comprising a step of providing, by the application program currently being executed, a user interface that can designate an extension of function without distinguishing between an already installed extension function and an extension function that has not yet been installed;
   wherein if an extension function that has not yet been installed has been designated via the user interface, it is determined at said determining step that installation of this extension function is necessary.

6. A method of controlling an information processing apparatus, comprising;
    a determining step of determining, during execution of an application program, whether installation of an extension function is necessary based upon a user's operation that has been received;
    a saving step of saving information, which identifies an extension function whose installation is necessary, in a memory if it has been determined that installation of the extension function is necessary;
    a terminating step of activating an installer for the extension function whose installation is necessary, and terminating the application program;
    an activating step of activating the application program in response to completion of installation of the extension function by the installer; and
    a step of activating the extension function, which has been installed by the installer, in accordance with the activated application program, based upon the identifying information that has been saved in the memory,
    wherein at said determining step, if an extension function that has been designated by the user's operation has already been installed, whether updating of this already installed extension function is necessary or not is confirmed and, if updating is necessary, it is further determined that installation of the extension function is necessary.

7. The method according to claim 6, wherein updating of the already installed extension function includes replacing it with another extension function;
    the installer provides replacement information that correlates the already installed extension function that has been replaced and the other extension function; and
    at said step of activating the extension function, the other extension function is activated from the identifying information, which has been saved in the memory, based upon the replacement information.

8. An information processing apparatus having a computer comprising:
    a determining unit configured to determine whether installation of an extension function is necessary based upon a user's operation that has been received;
    a saving unit configured to save information, which identifies an extension function whose installation is necessary, in a memory if it has been determined that installation of the extension function is necessary;
    a terminating unit configured to activate an installer of the extension function whose installation is necessary and to terminate the application program;
    a first activating unit configured to activate the application program in response to completion of installation of the extension function by the installer; and
    a second activating unit configured to activate the extension function, which has been installed by the installer, based upon the identifying information that has been saved in the memory, at activation of the application program by said first activating unit,
    wherein if the data that is in the course of being edited by a data editing function exists, then, said terminating unit terminates the application program after the user confirms that editing processing has been completed.

9. A non-transitory computer-readable storage medium storing a program for causing a computer to execute:
    a step of determining whether installation of an extension function is necessary based upon a user's operation that has been received;
    a step of saving information, which identifies an extension function whose installation is necessary, in a memory if it has been determined that installation of the extension function is necessary;
    a step of activating an installer of the extension function whose installation is necessary and terminating this program; and
    at the time of activation from the installer, a step of activating the extension function, which has been installed by the installer, based upon the identifying information that has been saved in the memory,
    wherein if the data that is in the course of being edited by a data editing function exists, then, at said terminating step, the application program is terminated after the user confirms that editing processing has been completed.

10. An information processing apparatus having a computer comprising:
    a determining unit configured to determine whether installation of an extension function is necessary based upon a user's operation that has been received;
    a saving unit configured to save information, which identifies an extension function whose installation is necessary, in a memory if it has been determined that installation of the extension function is necessary;
    a terminating unit configured to activate an installer of the extension function whose installation is necessary and to terminate the application program;
    a first activating unit configured to activate the application program in response to completion of installation of the extension function by the installer; and
    a second activating unit configured to activate the extension function, which has been installed by the installer, based upon the identifying information that has been saved in the memory, at activation of the application program by said first activating unit,
    wherein said determining unit confirms, if an extension function that has been designated by the user's operation has already been installed, whether updating of this already installed extension function is necessary or not and, if updating is necessary, said determination unit further determines that installation of the extension function is necessary.

11. A non-transitory computer-readable storage medium storing a program for causing a computer to execute:
    a determining step of determining, during execution of an application program, whether installation of an extension function is necessary based upon a user's operation that has been received;
    a saving step of saving information, which identifies an extension function whose installation is necessary, in a memory if it has been determined that installation of the extension function is necessary;
    a terminating step of activating an installer for the extension function whose installation is necessary, and terminating the application program;
    an activating step of activating the application program in response to completion of installation of the extension function by the installer; and
    a step of activating the extension function, which has been installed by the installer, in accordance with the activated application program, based upon the identifying information that has been saved in the memory,
    wherein at said determining step, if an extension function that has been designated by the user's operation has already been installed, whether updating of this already installed extension function is necessary or not is confirmed and, if updating is necessary, it is further determined that installation of the extension function is necessary.

* * * * *